Dec. 29, 1931.  A. PETER  1,838,960
METER CALIBRATING APPARATUS
Filed Aug. 24, 1929
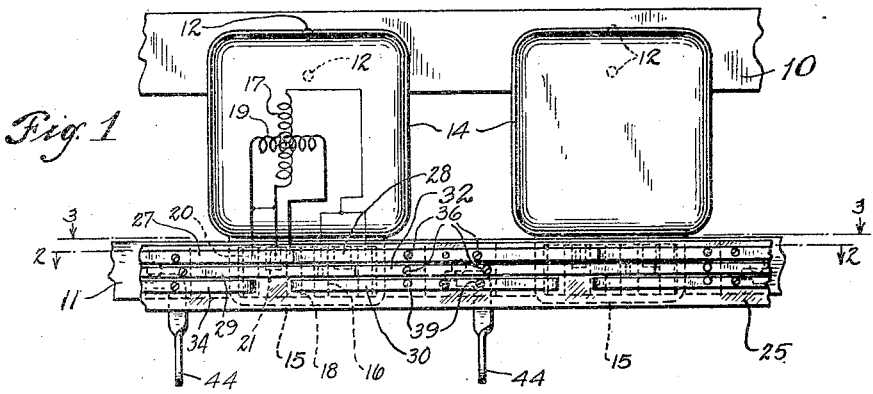
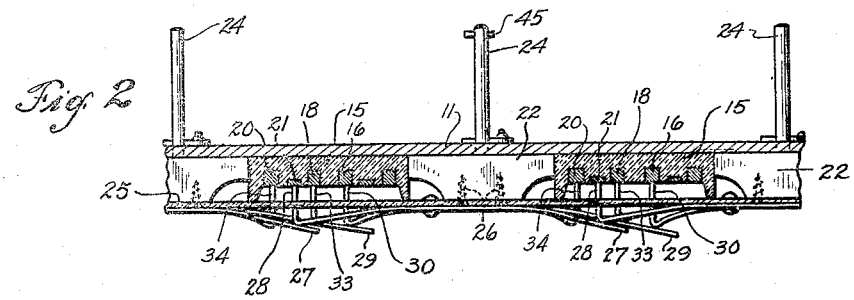
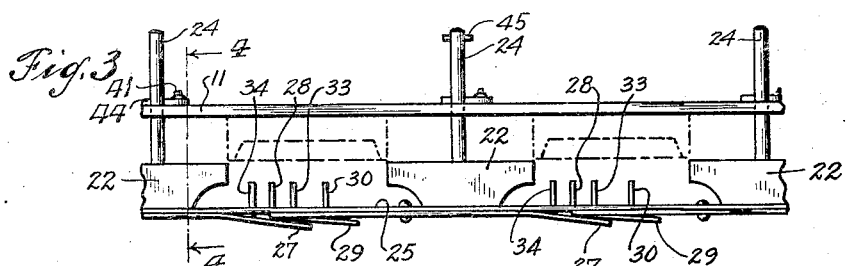
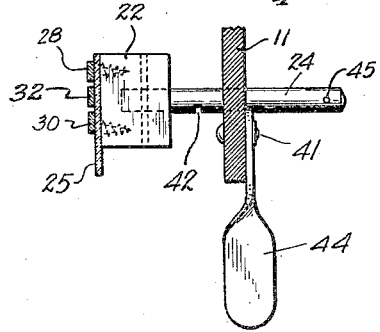
INVENTOR
Adolf Peter
BY John D. Morgan
ATTORNEY.

Patented Dec. 29, 1931

1,838,960

UNITED STATES PATENT OFFICE

ADOLF PETER, OF ZUG, SWITZERLAND, ASSIGNOR TO LANDIS & GYR, A.-G., A JOINT-STOCK COMPANY OF SWITZERLAND

METER CALIBRATING APPARATUS

Application filed August 24, 1929, Serial No. 388,185, and in Switzerland August 23, 1928.

The present invention relates to improvements in meter calibrating apparatus and more particularly to apparatus for quickly and positively completing the necessary connections with the meters to be tested.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a fragmentary elevation of one embodiment of the present invention;

Fig. 2 is a section taken on the line 2—2 of Fig. 1;

Fig. 3 is a horizontal section taken on the line 3—3 of Fig. 1;

Fig. 4 is a detailed cross section taken on the line 4—4 of Fig. 3;

Fig. 5 is a detailed elevation of a modified form of latching means.

The present invention provides an apparatus for quickly and positively completing the terminal connections of a plurality of electricity meters to be calibrated, at the same time insuring that the meters are accurately positioned in the desired relation, and is particularly useful in the simultaneous calibration of a large number of induction watt-hour meters, although it can be used with equal success in connection with other meters.

In the present preferred embodiment there is provided a support for a plurality of meters of the type described with means for accurately positioning the meters on the support. Means are also provided for making all the necessary connections with the terminal boxes of the meters to be calibrated and preferably for automatically effecting the connections as the positioning means of the meter are brought into operation. The connecting means preferably provide a resilient contact with the meter terminals and means may be provided for holding the contacts in circuit closing position during the calibration of the meters.

The remaining objects and features will be set out later in connection with the detailed description, and it will be understood that the foregoing and also the following description is explanatory and exemplary and is not restrictive of the invention.

Referring now in detail to the present preferred embodiment of the invention as illustrated by the accompanying drawings, there is provided a support for the meters to be calibrated, which preferably comprises a pair of parallelly extending flat bars 10 and 11, suitably spaced from each other and provided with meter attaching means, such as studs 12, to engage the lugs generally provided on the rear of the meter casings 14. The present embodiment of the invention as shown, is designed for use in connection with electricity meters, such as watt-hour meters, provided with the usual terminal boxes 15, containing the terminals of the meter coils. As shown, each terminal box is provided with insulating material in which are embedded terminal 16, connected with the voltage coil 17 of the meter, terminal 18 connected with the current coil 19 of the meter, and terminals 20, 21 connected with both the voltage and the current coils.

Means are preferably provided for accurately spacing the meters and their terminal boxes from each other, and as embodied, spacers 22 formed of insulating material such as wood, fibre or hard rubber, and of a size to substantially fill the space between adjacent terminal boxes 15 are mounted on the lower supporting bar 11 by means of rods 24, passing through corresponding apertures in the supporting bar 11, thereby allowing the spacers 22 to be moved to and from supporting bar 11.

For holding the spacers and preventing their turning on rods 24, spacers 22 are connected together by an overlying strip 25 of relatively thin flexible insulating material such as celluloid or fibre, suitably secured to the spacers 22 as by screws 26.

For making the necessary connections with the terminals 16, 18, and 20 of the meters, and, in the case of watt-hour meters, for connecting the voltage coils of all the meters in parallel and the current coils in series, there are preferably provided a plurality of connectors, in the form of narrow strips of electrically conducting material supported on the outer face of insulating strip 25 and provided with suitably arranged contact members to contact with the terminals of the meter coils. In the present embodiment, there are provided a plurality of strips 27 of resilient, electrically conducting material, such as brass or bronze, extending along the upper edge of insulating strip 25 and provided with inwardly extending contact members 28 suitably positioned with respect to spacers 22, to contact with terminals 21 of the several meters to be calibrated. Directly below connectors 27, are connectors 29, similarly mounted on strip 25 and provided with contact members 30 to contact with terminals 16. Another series of connectors are provided and comprise conducting strips 32, similarly mounted, and provided with inwardly extending contact members 33 and 34 for contacting with terminals 18 and 20, respectively.

Preferably, and as shown, the contact members for engaging the terminals are resiliently mounted and, as embodied, the strips 27 and 29 are formed as a plurality of alined strips, one end of each strip being bent inwardly to form contact members 28 and 30 respectively, the other ends of the strips being straight, overlapping the next alined strip and serve as a spring to inwardly press the contact members. Strips 28 and 30 are preferably secured medianly of each section to insulating strip 25 by rivets 36.

The series connecting strips 38 are provided with inwardly extending contact members formed by the inwardly bent ends 33 and 34 of the strips 38, the strips 38 being resiliently secured to strip 25 by rivets 39. Contact members 33 and 34 contact with terminals 18 and 20 respectively and connect terminal 18 of one meter in series with terminal 20 of the meter next in line.

While the spacing members 22 and strip 25 are in the position shown in Figure 3, the meters can be easily put in place or removed. When the meters have been put in place, spacers 22 are moved towards the supporting bar 11, and may be held or latched in this position by means of latch bar 40, pivoted at 41 and cooperating with a notch 42 formed in slidable rod 24. For automatically latching the spacers against supporting bar 11, there may be provided a spring 43 (Fig. 5) tending to move the latch 40 into notch 42, from which it may be released by movement of handle 44. Means are provided for preventing spacers 22 from being moved too far from bar 11, and for this purpose, a pin 45 may be provided, frictionally secured in a hole at the rear of rods 24.

When other types of meters are to be calibrated, pins 45 are removed, and all the spacers, connectors, and contact members can be removed as a unit, and replaced by others corresponding to the meters to be calibrated.

The invention in its broader aspects is not limited to the specific mechanisms shown and described but departures may be made therefrom within the scope of the accompanying claims without departing from the principles of the invention and without sacrificing its chief advantages.

What I claim is:—

1. Apparatus for use in the calibration of meters including in combination a support for a plurality of meters to be calibrated, meter spacing means movable to and from the support for positioning the terminals of the meters, resilient connectors carried by the spacing means, and locking means, whereby the meters can be connected and accurately positioned by a single movement of the spacing means.

2. Apparatus for use in the calibration of meters including in combination a support for a plurality of induction meters having current and voltage coils, means for connecting the current coils in series, means for connecting the voltage coils in parallel, means for positioning the meters and means for effecting the meter connections by movement of the spacing means.

3. Meter calibrating apparatus including in combination a support for a plurality of meters, means for securing a plurality of meters in calibration position on the support, a plurality of resilient connectors to contact with the terminals of the meters, and means for simultaneously operating the meter securing and connecting means.

4. Meter calibrating apparatus including in combination a support for a plurality of induction meters, means for securing the meters in predetermined position on said support, a plurality of connectors for connecting the voltage coils in parallel and the current coils in series, and means for simultaneously operating the meter securing and connecting means.

In testimony whereof, I have signed my name to this specification.

ADOLF PETER.